United States Patent
Power

[11] Patent Number: 6,101,759
[45] Date of Patent: Aug. 15, 2000

[54] ELECTRONICALLY AUTOMATED PORTABLE LIVE AND BAIT WELL

[76] Inventor: Mark G. Power, 19401 Everest Path, Farmington, Minn. 55024

[21] Appl. No.: 09/175,330

[22] Filed: Oct. 18, 1998

Related U.S. Application Data

[63] Continuation of application No. 08/633,107, Apr. 16, 1996, Pat. No. 5,822,916.

[51] Int. Cl.[7] ................................................. A01K 97/05
[52] U.S. Cl. .................. 43/55; 43/56; 43/57; 261/121.2
[58] Field of Search ................................. 43/55, 56, 57; 206/315.11; 261/121.2; 119/226, 227, 248, 245

[56] References Cited

U.S. PATENT DOCUMENTS

| | | |
|---|---|---|
| 2,151,225 | 3/1939 | Newton . |
| 2,639,906 | 5/1953 | Butler . |
| 2,923,087 | 2/1960 | Cummings . |
| 3,040,469 | 6/1962 | Richards . |
| 3,822,498 | 7/1974 | Butler . |
| 4,162,681 | 7/1979 | Patterson ..................................... 119/3 |
| 4,168,590 | 9/1979 | Beshoner, Sr. . |
| 4,271,099 | 6/1981 | Kukla . |
| 4,462,180 | 7/1984 | Scott . |
| 4,748,765 | 6/1988 | Martin . |
| 4,776,127 | 10/1988 | Jackson . |
| 4,815,411 | 3/1989 | Burgess . |
| 4,821,445 | 4/1989 | Bass . |
| 4,887,380 | 12/1989 | Andrews ..................................... 43/56 |
| 4,896,452 | 1/1990 | Smith et al. . |
| 4,945,672 | 8/1990 | Raia . |
| 4,970,982 | 11/1990 | Martin ....................................... 43/56 |
| 5,010,836 | 4/1991 | Riviezzo ................................... 114/255 |
| 5,050,526 | 9/1991 | Nelson et al. . |
| 5,172,511 | 12/1992 | Smith ....................................... 43/56 |
| 5,193,301 | 3/1993 | Figgins . |
| 5,231,789 | 8/1993 | Radmanovich . |
| 5,305,544 | 4/1994 | Testa, Jr. . |
| 5,347,746 | 9/1994 | Letson . |
| 5,406,740 | 4/1995 | Wilkin ....................................... 43/56 |
| 5,459,886 | 10/1995 | Payne ......................................... 4/508 |
| 5,499,473 | 3/1996 | Ramberg ................................... 43/55 |
| 5,799,435 | 9/1998 | Stafford ..................................... 43/57 |
| 5,921,017 | 7/1999 | Clark ......................................... 43/57 |

*Primary Examiner*—Jack W. Lavinder

[57] ABSTRACT

A battery operated storage container which is divided into two compartments, one for bait and a second for fish caught. It incorporates a pump for filling the compartments to a preset level and a pump to empty the compartments. It also contains an electronic control panel which allows the user to select which functions he/she wants to perform. These functions include filling, emptying, recycling, and aerating the water. The functions can be performed simultaneously or independently.

11 Claims, 1 Drawing Sheet

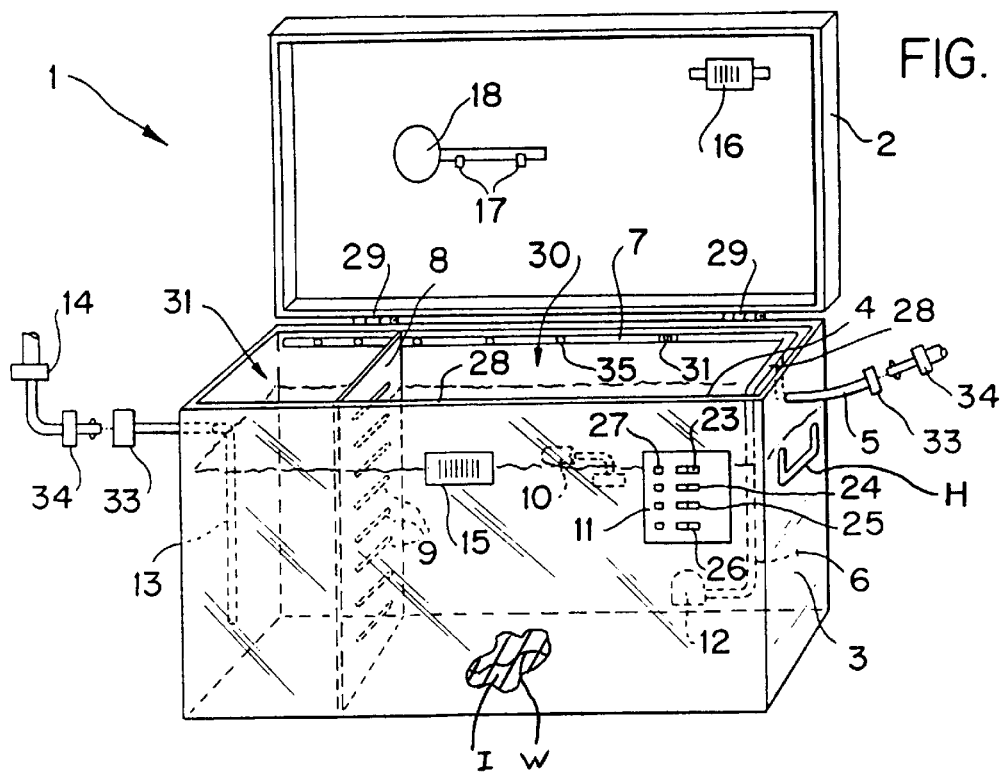
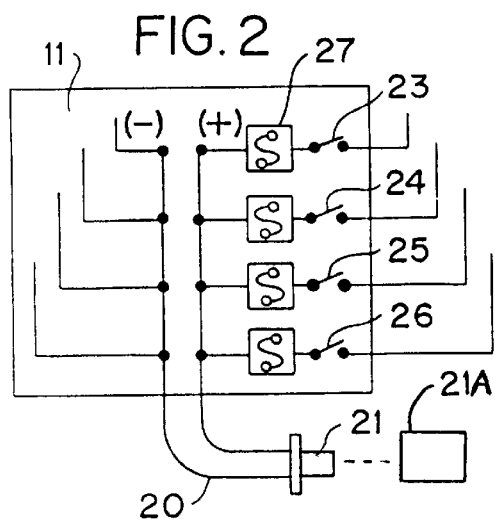
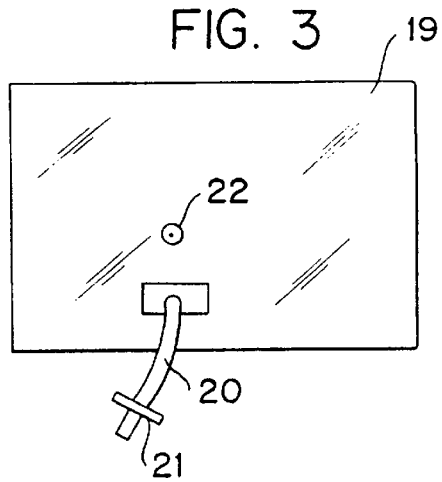
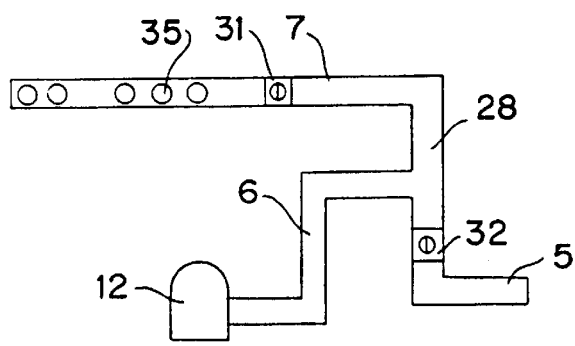

ELECTRONICALLY AUTOMATED PORTABLE LIVE AND BAIT WELL

This application is a continuation of application Ser. No. 08/633,107 filed on Apr. 16, 1996, now U.S. Pat. No. 5,822,916, and claims the benefit thereof under 35 U.S.C. § 120.

BACKGROUND OF THE INVENTION

This invention relates, in general, to accessories for fishermen, and, in particular, to an electronically controlled well for live bait as well as fish which have been caught.

DESCRIPTION OF THE PRIOR ART

In the prior art various types of bait wells have been proposed. For example, U.S. Pat. No. 4,896,452 discloses a bait well having an aerator which is solar powered. U.S. Pat. No. 5,050,526 discloses a live well for fish and ice chest combination with straps for fixedly attaching the well to a fishing boat. U.S. Pat. No. 5,193,301 discloses a portable bait or minnow bucket designed to fit within an insulated receptacle. U.S. Pat. No. 5,231,789 discloses a combination dry bait container and aerator apparatus which will fit into a commercially available thermally insulated chest-type cooler. U.S. Pat. No. 5,305,544 discloses a multi-compartment insulated chest having a lower portion divided into two compartments and an upper compartment with a lid and a secondary hatch.

Although many bait wells have been proposed, the prior art devices either do not make provisions for a complete well or require some functions to be performed manually or not at all. The present invention takes into account all the needed functions required by a serious fisherman and provides a single bait well which will perform all necessary functions without undue attention from the user.

SUMMARY OF THE INVENTION

The present invention incorporates a battery operated storage container which is divided into two compartments, one for bait and a second for fish caught. It incorporates a pump for filling the compartments to a preset level and a pump to empty the compartments. It also contains an electronic control panel which allows the user to select which functions he/she wants to perform. These functions include filling, emptying, recycling, and aerating the water. The functions can be performed simultaneously or independently. In addition, the unit is portable and is not restricted to being permanently mounted. Also, the input and discharge lines have conventional snap-on/snap-off connectors for easy connection and disconnection of water lines. This will eliminate the need to screw or unscrew the water or discharge lines.

It is an object of the present invention to provide an electronically controlled live fish and bait well which can fill, empty the well, as well as recycle or aerate the water in the well.

It is an object of the present invention to provide an electronically controlled live fish and bait well which can automatically fill the well to a preset limit.

It is an object of the present invention to provide an electronically controlled live fish and bait well which can automatically perform several functions simultaneously or independently.

These and other objects and advantages of the present invention will be fully apparent from the following description, when taken in connection with the annexed drawings.

BRIEF DESCRIPTION OF THE DRAWINGS

FIG. 1 is a perspective view of the present invention.

FIG. 2 is a schematic view of the wiring diagram of the present invention.

FIG. 3 is a view of the back of the present invention.

FIG. 4 is a schematic view of the recirculation system of the present invention.

DESCRIPTION OF THE PREFERRED EMBODIMENT

Referring now to the drawings in greater detail, FIG. 1 shows a perspective view of the live fish and bait well 1. It consists of a box 3 having an outer wall and an inner wall 4 which are separated by a space 28. This space serves two purposes, it allows electrical wires W to be run to various fixtures (as will be explained more fully below) and it allows the well to be insulated. The insulation I can be any conventional type of insulation for example, but not limited to, foam insulation. The box 3 includes a handle H spaced from edge portions of a sidewall of the box 3.

The well has a lid 2 which is hinged to the well by any conventional hinges 29. The lid can also have a conventional latch (not shown) to secure the lid 2 to the box 3. On the inside of the lid is a pair of conventional spring clips 17 which can be used to hold accessories such as, but not limited to, a minnow net 18. Also mounted on the inside of the lid is a dome light 16. The wires for the dome light can be run through the space 28, through the hinge 29, through the walls of the lid 2, and then to the light 16. Alternatively, the dome light 16 could be battery operated.

The well 1 is divided into two separate compartments 30, 31 by an optional removable panel 8 which has narrow apertures 9 placed therein. The panel 8 can be permanently installed within the well or it can be removable. For example, the front and back walls of the well could be provided with grooves (not shown) which would receive the edges of the panel 8 to allow it to be removed. The compartment 30 could be used to store fish that have been caught, and the compartment 31 could be used to store live bait fish such as, but not limited to, minnows. The apertures 9 allow water to be exchanged between the two compartments. The apertures should be wide enough so a proper amount of water can be transferred from one compartment to the other, but small enough so the bait fish can not swim from one compartment to the other.

Within the well 1 is mounted a pump 12 which can be a small pump, known as a sump pump, and which can be activated by the control panel. The pump can be run from a conventional 12 volt electrical source and turned on or off by one of the switches on the control panel 11. The electrical source could be the electrical system found on most boats, or it could be a stand alone battery. The pump 12 is connected by means of tubes or pipes 6 and 28 to pipe 7, which has a series of apertures 35 spaced therealong. When the pump 12 is turned on by way of the control panel 11, it will force water through the pipes or tubes 6 and 28 to pipe 7, and then through apertures 35 in order to aerate or circulate the water in the well. It should be noted that the pipe or tube 7 is shown mounted near the top of the well, however, the location is not critical and it could be mounted anywhere. Also, the apertures 35 are shown as directed toward the front of the well, but they could also be directed downward, toward the floor.

On one side of the well is an discharge pipe 5 and on the other side is an intake pipe 13. The pipes can be mounted anywhere on the well and serve the same functions. Connected to the intake pipe 13 is another conventional pump 14. The pump 14 can be connected to a source of water and when turned on will supply the well with water for the bait fish as well as any fish that have been caught. Also, since the well is provided with a discharge pipe 5, the user can keep the pumps 12 and 14 running and, thereby, keep a supply of fresh water constantly running into and out of the well. Input line or pipe 13 has snap-on/snap-off connectors 33, 34 for easy connection and disconnection of water lines. Discharge line or pipe 5 has snap-on/snap-off connectors 33, 34 for easy connection and disconnection of water lines. In addition, a cutoff float 10 can be mounted to the inside of the well so that when the water level reaches a preselected level, power to the pump 14 will be cut off. The float 10 is a conventional float similar to the floats used in condensate pumps in home furnaces or bilge pump float switches.

On the front wall of the well is mounted another light 15 and a control panel 11, which will control the various electrical items such as the pumps and the lights. The control panel 11 is shown schematically in FIG. 2. It consists of a series of fuses 27 which are connected in series to switches 23–26. The switches are preferably the rocker type of switch which will light up when the switch is turned on, however, other types of switches could be used without departing from the scope of the invention. Switch 23 could be attached to the light 16, switch 24 to light 15, switch 25 to pump 12, and switch 26 to pump 14. These assignments are merely for illustration purposes, and any of the switches could be attached to any of the various electrical components. Also, additional switches could be added to control other electrical devices which a user might want to incorporate into the well.

The various switches and fuses are connected by means of a wire 20 and standard 12 volt connector 21 to a power source 21A, such as a stand alone battery, referred to above, or to a 12 volt power source. Also, if desired the well can be hard wired to a boats electrical system if the well is to be a permanent fixture on the boat.

As shown in FIG. 3 the power cord 20 exits from the back wall 19 of the well, however, this location is not critical and the power cord could be mounted in any convenient location. Also mount on the back wall is a jack 22 which can be used to attach a conventional external pump (not show) or some other electrical device.

FIG. 4 shows a schematic view of the recirculation system of the present invention. Pump 12 is connected to pipe 6 which is connected to pipes 28 and 5. Pipe 28 is connected to pipe 7 which has apertures 27, as explained above. Connected in pipe 7 is a conventional water valve 31, and a similar valve 32 is connected between pipes 28 and 5. If the user wants to recirculate the water in the well he/she opens valve 31 and closes valve 32, which will cause pump 12 to recirculate the water in the well. If the user wants to dump the water in the well he/she opens valve 32 and closes valve 31, which will cause pump 12 to pump the water out of the well.

Although the live fish and bait well and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A hand carriable and structurally and functionally independent live well, comprising, in combination:
    a) a closeable receptacle which holds water, with the receptacle being structurally independent such that the receptacle may be hand carried, with the receptacle including a handle for carrying the receptacle;
    b) a conduit and pump arrangement which pumps water into and out of the receptacle, with the conduit and pump arrangement having a conduit portion engaged to the receptacle and with the conduit and pump arrangement further comprising a pump;
    c) an electrical power source electrically engaged to the pump such that the well is functionally independent; and
    d) a cutoff apparatus which automatically controls the level of water in the receptacle, with at least a portion of the cutoff apparatus mounted on an inside portion of the receptacle such that, when the level of water reaches a preselected level in the receptacle, the cutoff apparatus automatically communicates with the pump to cut off the supply of water flowing into the receptacle provided by the pump.

2. The hand carriable, and structurally and functionally independent live well according to claim 1 and further comprising a divider in the receptacle, with the divider defining two compartments in the receptacle, with one compartment holding live relatively small bait and with the other compartment holding live relatively large caught fish, and with the divider having apertures therein, with a size of the apertures being less than a size of the live relatively small bait to prevent said small bait from swimming to the other compartment, with the size of the apertures being sufficiently large to permit water exchange between the two compartments.

3. The hand carriable, and structurally and functionally independent live well according to claim 1 wherein the receptacle comprises a sidewall with inner and outer wall portions and insulation between the inner and outer wall portions.

4. The hand carriable, and structurally and functionally independent live well according to claim 1 wherein the conduit and pump arrangement includes an inlet pump disposed outside of the receptacle for pumping water into the receptacle and an outlet pump disposed in the receptacle for pumping water out of the receptacle.

5. The hand carriable, and structurally and functionally independent live well according to claim 1, and further comprising a control panel engaged to the receptacle, with the control panel comprising a switch for controlling the pump.

6. A hand carriable and structurally and functionally independent live well, comprising, in combination:
    a) a closeable receptacle which holds water, with the receptacle being structurally independent such that the receptacle may be hand carried, with the receptacle including a handle for carrying the receptacle;
    b) a conduit and pump arrangement which pumps water into and out of the receptacle, with the conduit and pump arrangement having a conduit portion engaged to the receptacle and with the conduit and pump arrangement further comprising a pump;
    c) an electrical power source electrically engaged to the pump such that the well is functionally independent;
    d) a control panel engaged to the receptacle, with the control panel comprising a switch for controlling the pump; and e) a cutoff apparatus which automatically controls the level of water in the receptacle, with at least a portion of the cutoff apparatus mounted on an inside portion of the receptacle such that, when the level of water reaches a preselected level in the receptacle, the cutoff apparatus automatically communicates with the pump to cut off the supply of water flowing into the receptacle provided by the pump.

7. A method for keeping live fish alive in a hand carriable receptacle, with the receptacle comprising a closeable receptacle which holds water, with the receptacle being structurally independent such that the receptacle may be hand carried, with the receptacle further comprising a handle for carrying the receptacle, with the receptacle further comprising a conduit and pump arrangement which pumps water into and out of the receptacle, with the conduit and pump arrangement having a conduit portion engaged to the receptacle and with the conduit and pump arrangement further comprising a pump, with the receptacle further comprising an electrical power source electrically engaged to the pump such that the well is functionally independent, with a control panel engaged to the receptacle, with the receptacle further comprising a cutoff apparatus which automatically controls the level of water in the receptacle, with at least a portion of the cutoff apparatus mounted on an inside portion of the receptacle such that, when the level of water reaches a preselected level in the receptacle, the cutoff apparatus automatically communicates with the pump to cut off the supply of water flowing into the receptacle provided by the pump, with the method comprising in combination the steps of;

a) filling the receptacle with water via the conduit and pump arrangement, with the step of filling being controlled by the control panel;

b) emptying water from the receptacle via the conduit and pump arrangement, with the step of emptying being controlled by the control panel;

c) wherein water coming into the receptacle is cutoff automatically by the cutoff apparatus.

8. The method of claim 7 and wherein the conduit and pump arrangement further comprises an aerator in the receptacle, with the method further comprising the step of aerating the water in the receptacle with the aerator, with the step of aerating the water being controlled by the control panel.

9. The method of claim 7 and further comprising the step of aerating water in the receptacle via the conduit and pump arrangement, with the step of aerating being controlled by the control panel, with the step of aerating including the steps of drawing water from water in the receptacle and impinging said water onto a surface of water in the receptacle.

10. The method of claim 7 wherein the steps of filling and emptying occur simultaneously to thereby keep a supply of fresh water running into and out of the receptacle.

11. The method of claim 7 wherein the cutoff apparatus for controlling the level of water in the receptacle comprises a cutoff float apparatus.

* * * * *